United States Patent [19]

Nakamura et al.

[11] 3,954,908

[45] May 4, 1976

[54] FLAME RETARDANT RESIN COMPOSITION COMPRISING AN ACRYLONITRILE-STYRENE BASE TERPOLYMER, A DIFFERENT ACRYLONITRILE-STYRENE-CHLORINATED POLYETHYLENE TERPOLYMER AND ANTIMONY TRIOXIDE

[75] Inventors: Junichi Nakamura, Yokohama; Masao Ogawa, Tokyo, both of Japan

[73] Assignee: Showa Denko Kabushiki Kaisha, Tokyo, Japan

[22] Filed: Apr. 20, 1973

[21] Appl. No.: 353,192

[30] Foreign Application Priority Data

Apr. 21, 1972  Japan............................. 47-39667

[52] U.S. Cl..................... 260/876 R; 260/45.7 P; 260/45.75 B; 260/45.95 R; 260/878 R
[51] Int. Cl.²..................... C08L 51/00; C08L 53/00
[58] Field of Search............ 260/876 R, 878 R, 880

[56] References Cited
UNITED STATES PATENTS

| | | |
|---|---|---|
| 3,494,982 | 12/1970 | Grabowski et al............. 260/876 R |
| 3,496,251 | 2/1970 | Takahashi et al.............. 260/876 R |
| 3,558,745 | 1/1971 | Ogawa et al.................. 260/876 R |
| 3,673,279 | 6/1972 | Takashi et al................. 260/876 R |

*Primary Examiner*—Richard B. Turer
*Attorney, Agent, or Firm*—Sughrue, Rothwell, Mion, Zinn & Macpeak

[57] ABSTRACT

A resin composition having high flame retardance as well as high tensile strength, high impact strength and good moldability is composed of a resin blend comprising: (1) a ternary resin system of acrylonitrile, butadiene and styrene; a ternary resin system of acrylonitrile, acrylic rubber and styrene; a ternary resin system of acrylonitrile, ethylene-propylene rubber and styrene; or a ternary resin system of acrylonitrile, ethylene-vinyl acetate copolymer and styrene; (2) a ternary resin system of acrylonitrile, chlorinated polyethylene and styrene; and (3) antimony trioxide. Acrylonitrile may be replaced by methyl methacrylate and styrene by α-methyl styrene. Blends of components (1) are acceptable.

19 Claims, No Drawings

FLAME RETARDANT RESIN COMPOSITION COMPRISING AN ACRYLONITRILE-STYRENE BASE TERPOLYMER, A DIFFERENT ACRYLONITRILE-STYRENE-CHLORINATED POLYETHYLENE TERPOLYMER AND ANTIMONY TRIOXIDE

BACKGROUND OF THE INVENTION

1. Field of the Invention

The present invention relates to a flame retarding resin composition having good mechanical properties and good moldability. More particularly, the invention relates to a resin composition having high flame retardance, high impact strength and good moldability comprising: (1) one or more ternary resins selected from the group consisting of an acrylonitrile-butadiene-styrene ternary resin (hereafter called "ABS resin"); an acrylonitrile-acrylic rubber-styrene ternary resin (hereafter called "AAS resin"); an acrylonitrile/ethylene-propylene rubber/styrene ternary resin (hereafter called "AES resin"); and an acrylonitrile/ethylene-vinyl acetate copolymer/styrene ternary resin (hereafter called "AEvS resin"); (2) an acrylonitrile-chlorinated polyethylene-styrene ternary resin (hereafter called "ACS resin"); and (3) antimony trioxide.

2. Description of the Prior Art

ABS resin, AAS resin, AES resin and AEvS resin are known as engineering plastic structural materials having high mechanical properties, in particular, excellent tensile strength and impact strength. However, they have the fault of combustibility. Since regulations regarding the acceptable degree of flame retardance have recently come into force or have been strengthed for products in the fields of materials for buildings, vehicles, electronic and electric appliances in which these resins are used, there has been an urgent need for flame retardant resins of the above-mentioned ternary types, and various methods to increase the flame retardance of such ternary resins have been proposed or attempted.

For example, for rendering ABS resin flame retardant various flame retarding agents have been proposed. That is, it is known that ABS resin can be rendered flame retardant by incorporating therein an organic flame retarding agent such as an organohalogen compound, a halogenated phosphate ester, or a phosphate, or a mixture of an organic flame retarding agent and an auxiliary inorganic flame retarding agent, such as antimony trioxide, which further increases the flame retardant effect. However, for high flame retardancy a large amount of flame retarding agent is required, and although the purpose of rendering the ABS resin flame retardant may be attained by the addition of such a flame retarding agent, the addition of the flame retarding agent to ABS resin, etc., is accompanied by the undesirable effect that the excellent impact strength and tensile strength, as well as other preferred properties, of the resins are greatly reduced, and at the same time dripping during combustion occurs. For example, when general and inexpensive chlorinated paraffins are employed as a flame retarding agent for these resins, the impact strength of the resins is greatly reduced.

As described in the specification of, e.g., Japanese Patent Publication No. 2791/'58, a method has been proposed wherein ABS resin is rendered flame retardant by blending the ABS resin with polyvinyl chloride. This method has some merits in that the resin maintains proper hardness and toughness and also the reduction in impact strength is comparatively low due to the properties of polyvinyl chloride. On the other hand, because the thermal decomposition temperature of polyvinyl chloride is low, the molding temperature or working temperature for such a resin composition containing polyvinyl chloride must be lower than that for ABS resin per se to prevent thermal decomposition of polyvinyl chloride at molding or working, i.e., the molding temperature of the resin composition is lower than 180°C. Furthermore, the addition of polyvinyl chloride reduces the fluidity of the resin, and hence tends to greatly reduce the molding or working property of the resin. Moreover, the addition of a large amount of polyvinyl chloride having a low heat distortion temperature is undesirable for engineering plastics in which the heat distortion temperature is an important factor.

As described in the specification of U.S. Pat. No. 3,494,982, a further method comprises rendering ABS resin flame retardant by blending chlorinated polyethylene therewith. This method enables a high molding or working temperature to be used with the blend resin (as compared with the case of blending polyvinyl chloride) but the fluidity and the heat distortion temperature of the resin are reduced.

As mentioned above, conventional methods of rendering resins flame retardant may have the merit of rendering the resin flame retardant but conventional methods invariably result in a reduction in the thermal properties, impact strength, tensile strength and the molding and working properties of the resin. In other words, the resins thus rendered flame retardant do not have desirable properties as resins for molding.

Further, flame retarding agents are generally expensive, commercially availability is unstable, and the addition of a large amount of such flame retarding agents causes undersirable effects in resin properties and increases the cost of products made from the resins.

SUMMARY OF THE INVENTION

Considering these faults, the inventors made investigations to overcome the aforesaid difficulties that cannot be avoided by conventional methods and, as a result of their investigations, discovered that by incorporating a small amount of antimony trioxide in a blend of (1) one or more ternary resins selected from the group consisting of an ABS resin, AAS resin, AES resin and AEvS resin and (2) an ACS resin, as these materials are later defined, a resin composition having high flame retardance, high impact strength and good molding or working properties can be obtained without reducing the excellent properties specific to the aforesaid ternary resins.

DETAILED DESCRIPTION OF THE INVENTION

That is, the resin composition of this invention comprises a blend of (1) one or more ternary resins selected from the group consisting of an ABS resin, AAS resin, AES resin and AEvS resin and (2) ACS resin, having blended therein antimony trioxide.

If antimony trioxide alone is incorporated in ABS resin, AAS resin, AES resin or AEvS resin the flame retardance of the resins is not sufficiently improved as is the case if ACS resin alone is incorporated in these resins. On the other hand, if antimony trioxide is incorporated in a blend of both kinds of ternary resins as mentioned above according to the present invention, the flame retardance of the blend is improved effectively together with other desirable properties.

That is, due to a surprising synergistic effect of the ACS resin and antimony trioxide, the flame retardance of the resin composition greatly increases, and the resin composition has a higher impact strength and elongation that any of the aforesaid ternary resins alone.

Furthermore, since a resin composition prepared by adding chlorinated polyethylene by the above-mentioned conventional method is low in fluidity and becomes discolored at high molding temperatures, such a resin composition must be molded at a lower temperature than the aforesaid ternary resins per se, which results in reducing the moldability or workability of the resins. On the other hand, the resin composition of this invention is not accompanied with such difficulties and can be molded or worked at high production efficiency. This contributes to increase the molding cycle and the extrusion molding speed, and thus the industrial and economic value of this invention is quite high.

As mentioned above, the resin composition of this invention completely overcomes the troubles and difficulties encountered with the aforesaid conventional methods, has large industrial and economic value, and thus wide use of the resin composition can be expected.

The ABS resin used in this invention includes so-called graft type ABS resins prepared by polymerizing a monomeric mixture of styrene and acrylonitrile in the presence of a rubbery material such as polybutadiene, a styrene-butadiene copolymer rubber or an acrylonitrile-butadiene copolymer rubber; so-called blend type ABS resins prepared by mechanically mixing the above-mentioned rubbery material and a styrene-acrylonitrile copolymer; a mixed type resin of the graft type ABS resin and a styrene-acrylonitrile copolymer; resins as described in which a part or all of the styrene has been replaced with α-methylstyrene to improve the heat resistance of the resins; and resins as described in which a part or all of the acrylonitrile has been replaced with methyl methacrylate to improve the transparency of the resins. In the most preferred examples of the ABS resin, the content of the rubbery component is 10 ~ 95% by weight and the component ratio of acrylonitrile to styrene is 1~50/99~50 by weight percent.

Certain highly preferred embodiments of the ABS resin as described above do exist, and these can be described as follows. Most preferred of the graft type ABS resins are those where the backbone polymers meet the following criteria: polybutadiene having a Mooney viscosity $ML_{1+4}$ at 100°C (hereafter all Mooney viscosity values are $ML_{1+4}$ at 100°C) of about 30 to about 55; styrene-butadiene copolymer rubber containing less than about 85 weight percent styrene (based on styrene plus butadiene) having a Mooney viscosity $ML_{1+4}$ of about 20 to about 165; acrylonitrile-butadiene copolymer rubber having a nitrogen content of about 15 to about 60 weight percent based on copolymer weight, preferably 20 to 40 percent, and a Mooney viscosity $ML_{1+4}$ of about 30 to about 130. Using such materials to form the graft-type ABS resins, or as the rubbery material in the blend-type ABS resins prepared by mechanical mixing offers excellent results in accordance with the present invention.

Furthermore, most preferred styrene-acrylonitrile copolymers used in forming the blend-type ABS resins for the mixed type systems are styrene-acrylonitrile copolymers where the component ratio of acrylonitrile to styrene is 1–50/99–50 by weight percent and having a liquid viscosity in chloroform at 30°C $[\eta]$ of about 0.5 to about 2.0.

The AAS resin used in this invention is a ternary resin comprising a rubbery material as the base material, acrylonitrile, and styrene, the rubbery material mainly consisting of an acrylic acid alkyl ester.

In forming the AAS resin, the rubbery material is typically a copolymer, for example, a copolymer of acrylic acid ethyl ester and acrylonitrile, a copolymer of acrylic acid butyl ester and acrylonitrile, a copolymer of acrylic acid ethyl ester and 2-chloroethyl vinyl ether, and the like, where the ester component most preferably comprises 95 to 65 weight percent of the copolymer and the acrylonitrile or ether component comprises 5 to 35 percent by weight of the copolymer.

The AES resin used in this invention is a ternary resin comprising a rubbery material, acrylonitrile and styrene, the rubbery material being, for example, an ethylene-propylene copolymer or an ethylene-propylene-nonconjugated diene terpolymer prepared by adding a small quantity of a nonconjugated diene to an ethylene-propylene copolymer to facilitate crosslinking.

Most preferred of the ethylene-propylene copolymers which can be used as rubbery materials to form the AES resin of this embodiment comprise from about 35 to 85 weight percent ethylene and from about 65 to about 15 weight percent propylene, based on copolymer weight. This same ratio is carried over into the ethylene-propylene-nonconjugated diene terpolymer materials, where the nonconjugated diene is generally present in an amount on the order to 3 weight percent, based on terpolymer weight. Illustrative of the nonconjugated dienes used are dicyclopentadiene, 1,4-hexadiene, norbornene derivatives such as ethyl norbornene and the like. Most preferred of such copolymers or terpolymers are those having a density of about 0.85 to about 0.87 and a Mooney viscosity $ML_{1+4}$ of about 30 to about 120, more preferably 40 to 90.

The AEvS resin used in this invention is a ternary resin comprising a rubbery material, acrylonitrile and styrene, the rubbery material mainly consisting of an ethylene-vinyl acetate copolymer.

The most preferred ethylene vinyl acetate copolymers used in this embodiment comprises from about 10 to about 95 weight percent vinyl acetate, more preferably 20 to 35 weight percent vinyl acetate, balance ehtylene, and have a molecular weight of about 20,000 to 200,000.

The above-mentioned AAS resin, AES resin and AEvS resin can be a graft type resin, blend type resin or mixed type resin as in the case of the ABS resin, and they also include similar resins in which a part or all of the acrylonitrile or styrene has been replaced with methyl methacrylate or α-methylstyrene, respectively. Also, as most preferred examples of these resins, the content of the rubber component in the resins is 10 ~ 95 percent by weight and the component ratio of acrylonitrile to styrene is 1~50/99~50 by weight percent.

In all of these embodiments where the blend type or mixed type resin is used, most preferably the styrene-acrylonitrile copolymer has a liquid viscosity in chloroform at 30°C of $[\eta]$ = about 0.5 to about 2.0 and an acrylonitrile : styrene component ratio of 1~50/99~50 by weight percent.

As earlier indicated, the acrylonitrile in either the graft or acrylonitrile-styrene copolymer can be completely replaced with methyl methacrylate. In this case, the component ratio of methacrylate to styrene is somewhat broader than that of acrylonitrile to styrene, i.e., in the former case it can be 1~80/99~20 whereas in the latter case it is 1~50/99~50. When mixtures of acrylonitrile and methyl methacrylate are used in combination with styrene, an intermediate component ratio can be used, e.g., at a 50:50 weight ratio of methyl methacrylate to acrylonitrile, the component ratio of the blend to styrene can be 1~65/99~35.

In a similar manner, the styrene in either the graft or acrylonitrile-styrene copolymer can be completely replaced with α-methylstyrene in amounts up to 100%, and in this case the styrene values are not altered in the component ratio, i.e., the 1~50/99~50 proportion still applies.

If such replacements are made, most preferably the copolymer still exhibits an [η] of about 0.5 to about 2.0 at 30° C in chloroform.

These ternary resins described above can be prepared by known methods and while any types of such resins can be used, the use of the graft type resins is desirable from the viewpoint of the properties of the final products.

In short, it shall be understood that the present invention is not limited to ternary resins produced by any special process, and the process of production can be freely selected by one skilled in the art so long as, of course, the ternary resins are rubbery, solid materials. The following material describes preparation methods for the ternary resins which, while quite simple and easily conducted on an industrial scale, offer ternary resins of excellent characteristics for use in the present invention.

PREPARATION OF ABS

The acrylonitrile-butadiene-styrene ternary resin used in the present invention can be prepared by any well-known polymerization procedures including emulsion polymerization, bulk polymerization, suspension polymerization and bulk-suspension polymerization, e.g., as disclosed in U.S. Pat. Nos. 3,168,593, 3,010,936 and 2,538,051.

For example, an acrylonitrile-butadiene-styrene ternary resin can be prepared from 20 percent polybutadiene gum latex, 60 percent styrene monomer and 20 percent acrylonitrile (by weight) using an emulsifier (0.5 percent potassium oleate), a polymerization initiator (0.5 percent potassium persulfate) and a molecular weight controlling agent for the acrylonitrile-styrene produced (0.1 percent t-hexadecylmercaptan) at a temperature of 50°C for 6 hours under a nitrogen atmosphere. To the resulting polymerization reaction mixture water is added as a coagulant to coagulate the resulting ternary resin and the resin is filtered and dried.

PREPARATION OF AAS

The acrylonitrile-acrylic rubber-styrene ternary resin used in the present invention can be prepared in the same manner as the ABS resin. For example, the resin can be prepared by the following procedure:

| | |
|---|---|
| Butyl acrylate | 40% |
| Acrylonitrile | 10% |
| Sodium lauryl sulfate | 2% |
| Potassium persulfate | 0.05% |
| Pure water | 400% |

The above components are charged into a reactor and polymerized by an emulsion polymerization under a nitrogen atmosphere at 75°C for 4 hours. The resulting rubbery material can be purified by salting out, washing and drying (Mooney viscosity: about 45). 30 percent by weight of the rubbery material thus obtained is then dissolved in 52.5 percent styrene monomer and 17.5 percent acrylonitrile, and the mixture charged to a glass polymerization tube followed by purging with nitrogen.

After the addition of 0.5 percent benzoyl peroxide and 0.2 percent t-dodecylmercaptan (molecular weight controlling agent), the tube is sealed and heated at 70°C for 15 hours followed by annealing at 120°C for 5 hours. The resulting polymer is then removed, ground and dried.

PREPARATION OF AEvS

The acrylonitrile/ethylene-vinyl acetate copolymer/styrene ternary resin used in the present invention can be prepared in the same manner as the ABS resin. For example, the resin can be prepared by the following precedure:

| | |
|---|---|
| Ethylene-vinyl acetate copolymer (vinyl acetate content: 28%; MI = 20) | 30% |
| Styrene | 52.5% |
| Acrylonitrile | 17.5% |
| t-Butylperoxybenzoate | 0.3% |
| t-Dodecylmercaptan | 0.1% |
| Water + Dispersing agent (containing 1% polyvinyl alcohol) | 400% |

The powdered EVA is dispersed in water containing the dispersing agent and, after the addition of the polymerization initiator, the molecular weight controlling agent and the monomer, the mixture is stirred at a rate of 900 rpm. The system is purged with nitrogen and polymerized at 80°C for 1 hour, at 120°C for 3 hours and 140°C for 2 hours. The resulting resin is washed with aqueous hydrochloric acid at 80°C and dried.

PREPARATION OF AES

The AES resin can be prepared by the same polymerization procedures as are described for the ABS. For example, the resin can be prepared from the following composition:

| | | |
|---|---|---|
| (a) | Ethylene-propylene-non-conjugated diene (Mooney viscosity, 65; ethylene content, 55%; propylene content, 42%; non-conjugated diene content, 3%) | 60% |
| | Styrene | 30% |
| | Acrylonitrile | 10% |
| | t-Butylperoxybenzoate | 0.3% |
| | t-Dodecylmercaptan | 0.1% |
| | Water containing dispersing agent (0.1% polyvinyl alcohol) | 400% |
| (b) | Tricalcium phosphate | 2% |
| | Styrene | 75% |
| | Acrylonitrile | 25% |
| | t-Butylperoxybenzoate | 0.3% |
| | t-Dodecylmercaptan | 0.3% |
| | Water containing dispersing agent (0.1% polyvinyl alcohol) | 400% |

The composition (a) is polymerized in the same manner as is known for ethylene-vinyl acetate. The polymerization cycle is 120°C for 8 hours and 140°C for 2 hours. The resulting resin is washed with aqueous hydrochloric acid at 80°C and dried.

Composition (b) is polymerized in the same manner as (a).

The resulting resins (a) and (b) are blended in a ratio of 1:1 to prepare the composition.

The ACS resin used in this invention can be prepared by the methods described in, e.g., the specifications of U.S. Pat. Nos. 3,496,251 and 3,673,279 and Japanese Patent Publication Nos. 17,057/'64 and 21,727/'71. The ACS resin preferably used in this invention is a so-called graft type ACS resin prepared by polymerizing a monomer mixture of acrylonitrile and styrene in the presence of chlorinated polyethylene having a chlorination degree of 25 ~ 45 percent by weight, or a so-called graft-blend type ACS resin prepared by mixing the aforesaid graft type ACS resin and an acrylonitrile-styrene copolymer. In the most preferred ACS resins, the content of chlorinated polyethylene is 10 ~ 95 percent by weight and the component ratio of acrylonitrile to styrene is 1~50/99~50 percent by weight. In addition, ACS resins as described wherein all or part of the acrylonitrile has been replaced with methyl methacrylate and all or part of the styrene has been replaced with α-methylstyrene can also be used in this invention.

In the case of replacing acrylonitrile with methyl methacrylate and/or styrene with α-methylstyrene, the expansion in the component ratios of these components grafted onto the backbone or in the acrylonitrile-sytrene copolymer heretofore described also apply for ACS resins. An ACs resin per se containing less than 10 percent or more than 95 percent chlorinated polyethylene has poor physical properties and moldability or workability, and when such as ACS resin is mixed with the aforesaid ternary resin(s), a blend having excellent properties is not obtained.

Certain highly preferred ACS resins do exist, however, and these are generally those wherein the polyethylene backbone of the chlorinated polyethylene has an average molecular weight greater than about 100,000. There is no upper limit on the average molecular weight of the polyethylene, but most preferably the molecular weight is from 100,000 to 500,000.

In forming the ACS resin systems, it is to be noted that a graft-blend type ACS resin is specifically contemplated. In this case, the acrylonitrile-styrene copolymer, which most preferably has a liquid viscosity in chloroform and acrylonitrile: styrene component ratio as heretofore described for the ternary resin embodiments, essentially serves as a "diluent" for the final resin composition. For instance, as indicated below the resin composition of the present invention can comprise relatively high amounts of ACS containing relatively high amounts of the chlorinated polyethylene component, but there is a limit on the content of the chlorinated polyethylene component of 5 ~ 40 percent by weight. Thus, in certain instances where high amounts of ACS resin with near the maximum amounts of chlorinated polyethylene are used, acrylonitrile-styrene copolymer would be added to insure the final chlorinated polyethylene content in the resin composition does not exceed the 40 percent by weight limit. Of course, since acrylonitrile-styrene polymer is used in certain embodiments blended with the ternary resin systems, the diluent function can be served by acrylonitrile-styrene copolymer from either source. It will be apparent, of course, that this is not the only function of the acrylonitrile-styrene copolymer and it can and will often be added in cases where the chlorinated polyethylene content would be within the 5 ~ 40 percent bound even if the acrylonitrile-styrene copolymer were not added.

Further, the acrylonitrile and styrene in either the graft or acrylonitrile-styrene copolymer can be replaced in whole or in part by methyl methacrylate or α-methylstyrene, respectively. In this case the broadened component ratio (1–80/99–20, etc.) heretofore described can apply.

The resin composition of this invention comprises (1) 10 ~ 90 percent by weight, preferably 50 ~ 90 percent by weight, of one or more ternary resins selected from the group consisting of the ABS resin, the AAS resin, the AES resin and the AEvS resin, (2) 90 ~ 10 percent by weight, preferably 50 ~ 10 percent by weight of the ACS resin containing 10 ~ 95 percent by weight chlorinated polyethylene component having a chlorination degree of 25–45 percent by weight, the content of the chlorinated polyethylene component being 5 ~ 40 percent by weight of the whole resin composition and the total amount of the chlorinated polyethylene component and the rubbery component of the ternary resin (1) being not over 50 percent by weight of the resin composition, and (3) antimony trioxide in an amount of 2 ~ 15 PHR per 100 parts by weight of the resin composition.

If the content of the ternary resin (1), such as the ABS resin, etc., is higher than 90 percent by weight of the whole resin composition, the impact strength and the flame retardance of the final product becomes inferior, while if the content of the ternary resin (1) is lower than 10 percent by weight, the excellent properties, in particular the toughness and the heat distortion temperature of the resin composition, are reduced. If, in particular, a resin composition having excellent thermal stability is desired, it is preferred that the content of the ternary resin (1), such as the ABS resin, etc., be in the range of 50 ~ 90 percent by weight of the whole resin composition.

Furthermore, if the content of chlorinated polyethylene in the resin composition is over 40 percent by weight, the mechanical properties, in particular, the toughness of the resin composition, are reduced, while if the content thereof is lower than 5 percent by weight, high flame retardance is not obtained. Still further, if the content of the rubbery component in the resin composition is over 45 percent by weight, the mechanical strength of the resin composition is reduced and thus properties desired for hard engineering plastics are lost.

As earlier indicated, the rubbery component plus chlorinated polyethylene totals no more than 50 percent by weight of the total resin composition. Accordingly, the minimum amount of rubbery component is 10 weight percent when the maximum amount of chlorinated polyethylene is present.

The amount of antimony trioxide can be adjusted suitably in accordance with the desired extent of flame retardance, but if the amount thereof is over 15 PHR the excellent properties of the resin composition are reduced, as well as the fact that the addition of such a large amount of antimony trioxide is undesirable form the industrial and economic view points. Also, if the content of antimony trioxide is less than 2 PHR, the synergistic effect thereof with the ACS resin is not obtained and obtaining high flame retardance is impossible.

Most preferably, the content of antimony trioxide is 2 to 8 PHR, and the antimony trioxide has an average particle size of about 1 micron to about 4 microns. This particle size range is not limitative and smaller and larger average particle sizes can be used, but this size range includes those antimony trioxides most commonly commercially available.

The resin compositions of this invention preferably have a combustion rate of less than 3 cm/min.

The flame retardance of the resin composition of this invention can be further improved by adding thereto 5 ~ 65 PHR of polyvinyl chloride or 2 ~ 20 PHR of an organic flame retarding agent such as an organohalogen compound or a halogenated phosphate ester. Examples of preferred organohalogen compounds are (Cl type) perchloropentacyclodecane, tetrachlorobisphenol A, tetrachlorophthalic anhydride, (Br type) tetrabromobisphenol A, tetrabromophthalic anhydride, hexabromobenzene, tetrabromobutane, and the like. Examples of preferred halogenated phosphate esters are (Cl type) tris (β-chloro ethyl) phosphate, tris (dichloro propyl) phosphate, (Br type) tris (2,3-dibromo propyl) phosphate, tris (2-bromo ethyl) phosphate, 2,3-dibromo propanol phosphate, and the like. For example, if polyvinyl chloride is added to the resin composition of this invention, the flame retardance of the resin composition further increases by a surprising amount due to the effect of the polyvinyl chloride and the ACS resin to provide a resin composition having a very high flame retardance as well as a higher impact strength. While the addition of polyvinyl chloride is accompanied by a reduction in moldability and heat distortion temperature in conventional techniques, in the case of adding polyvinyl chloride to the resin composition of this invention, a sufficient effect is obtained by the addition of a small amount thereof, and thus the problems of the prior art caused by the addition of polyvinyl chloride are lessened because the amount of polyvinyl chloride in this invention is quite small. The most preferred polyvinyl chlorides used in the present invention exhibit a degree of polymerization of from about 400 to about 2,000. As is known, polyvinyl chloride has a chlorine content of 56.8 percent.

In case of adding the aforesaid organic flame retarding agent to the resin composition of this invention, flame retardance is increased by a surprising amount due to the effect with the ACS resin even with small amounts of the flame retarding agent, and thus the reduction in the properties of the resin composition and the occurrence of a dripping phenomenon encountered in the case of adding a large amount of such a flame retarding agent do not occur in this invention.

As mentioned above, the resin compositions of this invention can be used in wide variety of fields.

The resin composition of this invention can be prepared by mixing the necessary components in an ordinary manner such as by a mixing roll, a kneader, a Banbury mixer, an extruder, and the like. In this case it is preferred to add a stabilizer as is usually used for polyvinyl chloride, such as a lead series stabilizer, a zinc series stabilizer and a metal soap.

The invention will now be illustrated in more detail by the following examples and comparison examples, in which the properties of the products were measured by as follows.

Flame retardance test: ASTM D 635
Thickness of test piece: 2.0 mm
Izod impact value; ASTM D 256-56
Tensile strength test: ASTM D 638
Fluidity: Measured by means of a Koka-type Flow Tester using a cylindrical nozzle (1 mm inner diameter; 10 mm length) under a load of 100 kg.
Heat distortion temperature: Load 264 psi
Discoloring time: 220°C Unless otherwise indicated, in the examples all percentages, parts and ratios are by weight.

Unless otherwise indicated, all [η] values in the examples were determined at 30°C in chloroform, and the antimony trioxide in the examples had an average particle size of 1 micron to 4 microns.

EXAMPLES 1~7 AND COMPARISON EXAMPLES 1~3

To 400 g of the blend of the ABS resin, the ACS resin, and antimony trioxide having the blending ratio shown in Table 1 there were added 8 g of tribasic lead sulfate and 4 g of dibutyl-tin maleate as stabilizers, and the mixture was kneaded for 5 minutes by means of 8-inch heating roll maintained at about 160°C to provide a resin composition. As comparison examples, a resin composition consisting of the same ABS resin having incorporated therein antimony trioxide alone, a resin composition containing polyvinyl chloride according to a conventional technique, and a resin composition containing antimony trioxide in an amount outside the scope of this invention were also prepared. Further, an example of the resin composition of this invention also containing polyvinyl chloride was prepared.

A test piece of each resin composition was prepared by compression molding each of the aforesaid resin compositions under a pressure of 150 kg/cm$^2$ at a temperature of 190°C, and then the properties of the test sample were measured according to the above-indicated methods, the results of which are shown in Table 2.

Table 1

| Example | | ABS resin | Antimony trioxide (PHR) | ACS resin (I) | ACS resin (II) | ACS resin (III) | PVC* |
|---|---|---|---|---|---|---|---|
| Comparison example | 1 | 100 | 10 | — | — | — | — |
| Example | 1 | 90 | 5 | — | 10 | — | — |
| " | 2 | 70 | 5 | — | 30 | — | — |
| " | 3 | 50 | 5 | — | 50 | — | — |
| " | 4 | 30 | 5 | — | 70 | — | — |
| " | 5 | 50 | 5 | 50 | — | — | — |
| " | 6 | 50 | 5 | — | — | 50 | — |
| " | 7 | 50 | 5 | — | 50 | — | 20 PHR |
| Comparison example | 2 | 50 | 5 | — | — | — | 50 |
| " | 3 | 90 | 16 | — | 10 | — | — |

*:polyvinyl chloride

In addition, the compositions of the resins used above were as follows:

ABS resin: This ABS resin was a graft resin having a rubbery component content of about 20 weight percent and correspondingly 80 weight percent acrylonitrile and styrene grafted thereon at a weight ratio of 1:3. The rubbery component was polybutadiene having a Mooney viscosity $ML_{1+4}$ on the order of 40. Grafting was performed with acrylonitrile and styrene exhibiting an [η] of 0.85.

ACS resin (I): The copolymer prepared by graft polymerization of acrylonitrile and styrene in the presence of chlorinated polyethylene having a chlorination degree of 30 percent. The content of the chlorinated polyethylene component was 73 percent. The polyethylene had a molecular weight of 300,000, and the copolymer contained 27 percent acrylonitrile and styrene grafted thereon at a weight ratio of acrylonitrile : styrene of 1:3. The acrylonitrile and styrene exhibited an $[\eta]$ of 0.70.

ACS resin (II): The same copolymer as above consisting, however, 55 percent chlorinated polyethylene.

ACS resin (III): A blend of ACS resin (I) and an acrylonitrile-styrene copolymer (1:3). The content of the chlorinated polyethylene component was 30 percent, and the acrylonitrile-styrene copolymer exhibited an $[\eta]$ of 0.70 in chloroform at 30°C.

Polyvinyl chloride: Degree of polymerization of 800 containing 56.8 percent chlorine.

Antimony trioxide: Made by Sumitomo Metal Industries Co.

impact value and elongation was great, which makes the practical value of such comparison samples very low.

2. Examples 1 ~ 4 show the cases of replacing a part of the ABS resin with ACS resin (II). As is clear from the results given above, as the content of the ACS resin increases, the flame retardancy of the resin compositions greatly improves, and by adding 5 PHR of antimony trioxide, the resin compositions were provided with sufficient flame retardancy and also the occurrence of a dripping phenomenon was prevented. Further, the resin compositions had improved Izod impact value and elongation. On the other hand, although the tensile strength and the heat distortion temperature of the resin compositions was reduced, such a reduction was very small as compared with the excellent balance of impact strength and tensile strength and caused Table 2

| Properties | Comparison example 1 | Example 1 | Example 2 | Example 3 | Example 4 |
|---|---|---|---|---|---|
| Burning rate (cm/min) | 5.52 | 2.94 | 2.28 | () | () |
| Dripping | Dripped | None | None | None | None |
| Izod impact value (ft-lb/in) | 1.5 | 3.5 | 3.7 | 4.0 | 4.8 |
| Fluidity (cc/sec) | $3.5 \times 10^{-2}$ | $4.1 \times 10^{-2}$ | $4.5 \times 10^{-2}$ | $5.0 \times 10^{-2}$ | $5.5 \times 10^{-2}$ |
| HDT*** (°C) | 86 | 85 | 85 | 85 | 84 |
| Discoloring time (min) | — | 45 | 45 | 40 | 35 |
| Tensile strength (kg/cm²) | 420 | 410 | 382 | 372 | 360 |
| Elongation (%) | 8 | 45 | 60 | 88 | 95 |

| Properties | Example 5 | Example 6 | Example 7 | Comparison example 2 | Comparison example 3 |
|---|---|---|---|---|---|
| Burning rate (cm/min) | (**) | 2.10 | (*) | (*) | 2.70 |
| Dripping | None | None | None | None | None |
| Izod impact value (ft-lb/in) | 5.0 | 3.7 | 5.0 | 2.4 | 1.6 |
| Fluidity (cc/sec) | $4.7 \times 10^{-2}$ | $5.8 \times 10^{-2}$ | $4.0 \times 10^{-2}$ | $4.0 \times 10^{-2}$ | $4.1 \times 10^{-2}$ |
| HDT*** (°C) | 84 | 86 | 82 | 78 | 85 |
| Discoloring time (min) | 35 | 45 | 25 | 5 | 45 |
| Tensile strength (kg/cm²) | 365 | 380 | 385 | 425 | 410 |
| Elongation (%) | 102 | 80 | 75 | 10 | 25 |

*Non-burning
**Self-extinguishing
***Heat distortion temperature

Burning rate was determined according to ASTM D-635.

Elongation was determined according to ASTM D-638, as were the ratings of non-burning and self-extinguishing.

The results of Table 1 and Table 2 show the following: The resin compositions of this invention shown in the examples are flame retardant, do not result in a dripping phenomenon and the burning rate thereof was less than 3.0 cm/min, which is sufficient for practical purposes. Also, the resin compositions were superior in Izod impact value and other properties, had high fluidity and hence had good moldability or workability. On the other hand, while the resin compositions in the comparison examples were also flame retardant, they were inferior in other properties. This will now be explained in more detail.

1. In the resin composition of Comparison example 1, prepared by adding antimony trioxide to the ABS resin alone, the flame retardant properties such as the burning rate and occurrence of dripping phenomenon were not improved very much, and the reduction in Izod almost no problems for practical purposes.

3. Examples 5 and 6 show the cases of blending different kinds of ACS resins and the results were almost same as those of Item (2) above.

Example 7 illustrates the case of adding 20 PHR of polyvinyl chloride to the resin composition of this invention. In this example, the flame retardance of the resin composition was further improved, the Izod impact value was improved, and further the discoloring time was superior to the case of adding polyvinyl chloride alone (e.g., see Comparison example 2). Thus, by the addition of a small amount of polyvinyl chloride to the resin composition of this invention, further improved resin compositions having excellent physical properties and moldability together with an excellent balance of properties were obtained.

4. Comparison example 2 shows the case of replacing 50 percent by weight of the ABS resin with polyvinyl chloride. The resin composition of this Comparison example had high flame retardancy and also some good properties. However, the Izod impact value, the heat distortion temperature, the discoloring time and the elongation of this comparison sample were inferior to those of the resin compositions of this invention. In particular, the poor thermal stability of the polyvinyl chloride used in such amounts caused serious problems in the molding of this resin composition.

5. Comparison example 3 shows the case of including antimony trioxide in an amount outside the scope of this invention. In this Comparison example, desirable flame retardancy was obtained but the Izod impact value and the elongation of the comparison sample were very low.

alone. The resin composition was combustible as well as inferior in Izod impact value.

Comparison example 5 is the case of replacing 50 percent by weight of the AAS resin with polyvinyl chloride. In this case, although the resin composition was provided with the desired flame retardancy, the reduction in the heat distortion temperature and the elongation was severe. On the other hand, the resin compositions of this invention had good flame retardancy as well as improved properties in general, in particular, excellent Izod impact value, fluidity, and elongation.

Table 3

| | Component ratio and properties | | | | |
|---|---|---|---|---|---|
| | Comparison example 4 | Comparison example 5 | Example 8 | Example 9 | Example 10 |
| AAS resin[1] | 100 | 50 | 70 | 50 | 30 |
| Antimony trioxide (PHR) | 10 | 5 | 5 | 5 | 5 |
| ACS resin (II)[2] | — | — | 30 | 50 | 70 |
| Polyvinyl chloride[3] | — | 50 | — | — | — |
| Burning rate (cm/min) | 5.70 | (*) | 2.40 | () | () |
| Dripping | Dripped | None | None | None | None |
| Idoz impact value (ft-lb/in) | 0.7 | 1.7 | 3.2 | 3.5 | 4.1 |
| Fluidity (cc/sec) | $7.7\times10^{-2}$ | $7.4\times10^{-2}$ | $8.1\times10^{-2}$ | $8.1\times10^{-2}$ | $7.8\times10^{-2}$ |
| HDT (°C) | 85 | 76 | 85 | 84 | 84 |
| Discoloring time (min) | — | 3 | 35 | 30 | 30 |
| Tensile strength (kg/cm$^2$) | 290 | 312 | 310 | 309 | 305 |
| Elongation (%) | 60 | 45 | 65 | 70 | 80 |

[1]:The AAS resin had a rubbery component content of about 30 weight %, with 70 weight % of acrylonitrile: styrene grafted thereon at an acrylonitrile: sytrene ratio of 1:3. The rubbery component was an acrylic acid butyl ester (90%): acrylonitrile (10%) copolymer which had a Mooney viscosity $ML_{1+4}$ of about 45, and the [η] of the acrylonitrile: styrene in the graft system (which was an emulsion polymerization) was 0.8.
[2]:Same product as in Examples 1 ~ 7 and Comparison examples 1 ~ 3.
[3]: do.
(*):Non-burning
(**):Self-extinguishing
HDT:Heat distortion temperature

EXAMPLES 8~10 AND COMPARISON EXAMPLES 4 AND 5

The same procedures as in Examples 1 ~ 7 and Comparison examples 1 ~ 3 were followed except that AAS resin was used in place of ABS resin, the results of which are shown in Table 3.

The resin composition in Comparison example 4 was prepared by adding antimony trioxide to the AAS resin

EXAMPLE 11 AND COMPARISON EXAMPLES 6 AND 7

The same procedures as in Examples 1 ~ 7 and Comparison examples 1 ~ 3 above were followed except that AES resin was used in place of the ABS resin, the results of which are shown in Table 4.

Table 4

| | Component ratio and properties | | |
|---|---|---|---|
| | Comparison example 6 | Comparison example 7 | Example 11 |
| AES resin[1] | 100 | 50 | 50 |
| Antimony trioxide | 10 | 5 | 5 |
| ACS resin (II)[2] | — | — | 50 |
| Polyvinyl chloride[3] | — | 50 | — |
| Burning rate (cm/min) | 6.72 | Non-burning | Self-extinguishing |
| Dripping | Dripped | None | None |
| Izod impact value (ft-lb/in) | 1.2 | 2.3 | 4.1 |
| Fluidity (cc/sec) | $4.1\times10^{-2}$ | $4.2\times10^{-2}$ | $6.0\times10^{-2}$ |
| HDT (°C) | 85 | 77 | 84 |
| Discoloring time (min) | — | 5 | 30 |
| Tensile strength (kg/cm$^2$) | 250 | 293 | 289 |
| Elongation (%) | 30 | 30 | 58 |

[1]:The AES resin had a rubbery component content of 30 weight % with 70 weight % of acrylonitrile: styrene grafted thereon at an acrylonitrile: styrene ratio of 1:3. The rubbery component was an ethylene (55 weight %): propylene (45 weight %) copolymer having a Mooney viscosity

Table 4-continued

| Component ratio and properties | | |
|---|---|---|
| Comparison example 6 | Comparison example 7 | Example 11 |

$ML_{1+4}$ of 65. The acrylonitrile: styrene in the graft system (suspension polymerization) had an [η] value of 0.8.
(2)Same products as in Examples 1 ~ 7 and Comparison examples 1 ~ 3.
(3)do.
HDT:Heat distortion temperature The results of Table 4 show the following: Comparison example 6 is the case of adding antimony trioxide to the AES resin alone, and the resin composition in this case was combustible and inferior in Izod impact value.

Comparison example 7 is the case of replacing a part of the AES resin with polyvinyl chloride. In this case, the flame retardancy was improved, as were the Izod impact value and the tensile strength, but the heat distortion temperature greatly decreased. On the other hand, the resin compositions of this invention had good flame retardancy as well as a high heat distortion temperature and tensile strength, and further had a greatly improved Izod impact value, fluidity, and elongation.

EXAMPLE 12 AND COMPARISON EXAMPLES 8 AND 9

The same procedures as in Example 1 ~ 7 and Comparison examples 1 ~ 3 were followed except that the AEvS resin was used in place of the ABS resin, the results of which are shown in Table 5.

Table 5

| | Component ratio and properties | | |
|---|---|---|---|
| | Comparison example 8 | Comparison example 9 | Example 12 |
| AEvS resin(1) | 100 | 50 | 50 |
| Antimony trioxide | 10 | 5 | 5 |
| ACS resin (II)(2) | — | — | 50 |
| Polyvinyl chloride(3) | — | 50 | — |
| Burning rate (cm/min) | 6.66 | Non-Burning | Self-extinguishing |
| Dripping | Dripped | None | None |
| Izod impact value (ft-lb/in) | 1.25 | 2.5 | 4.3 |
| Fluidity (cc/sec) | $3.2 \times 10^{-2}$ | $3.9 \times 10^{-2}$ | $5.2 \times 10^{-2}$ |
| HDT (°C) | 86 | 77 | 85 |
| Discoloring time (min) | — | 5 | 30 |
| Tensile strength (kg/cm²) | 352 | 360 | 340 |
| Elongation (%) | 30 | 29 | 65 |

(1)The AEvS resins had a rubbery component content of 30 weight % and 70 weight % acrylonitrile: styrene grafted thereon at a ratio of 1:3. The rubbery component comprised 28% vinyl acetate, balance ethylene, and had a melt index of about 20. The acrylonitrile: styrene exhibited an [η] value of 0.8 in the graft (suspension) system.
(2)Same products as in Examples 1 ~ 7 and Comparison examples 1 ~ 3.
(3)do.
HDT:Heat distortion temperature The results in Table 5 show the following: Comparison example 8 is the case of adding antimony trioxide to the AEvS resin alone, and in this case the resin composition was inferior in flame retardance as in the case of using the AES resin.

Comparison example 9 is the case of replacing 50 percent by weight of the AEvS resin with polyvinyl chloride. In this case, although the resin composition was provided with good flame retardancy, the reduction in the heat distortion temperature was great.

On the other hand, the resin compositions of this invention had good flame retardancy and heat distortion temperature, as well as an improved Izod impact value, fluidity, and elongation. While the tensile strength of the resin compositions was slightly low, such a slight reduction gave no problems in practical use.

While the invention has been described in detail and with reference to specific embodiments thereof, it will be apparent to one skilled in the art that various changes and modifications can be made therein without departing from the spirit and scope thereof.

What is claimed is:

1. A resin composition having high flame retardancy, excellent impact strength, and good moldability or workability comprising:
   1. 10 ~ 90 percent by weight of a first component comprising one or more ternary resin systems selected from the group consisting of a ternary resin comprising acrylonitrile, butadiene and styrene; a ternary resin of acrylonitrile, acrylic rubber and styrene; a ternary resin of acrylonitrile, an ethylene-propylene rubber and styrene; and a ternary resin of acrylonitrile, ethylene-vinyl acetate copolymer and styrene wherein the butadiene rubber component, acrylic rubber component, ethylene-propylene rubber component, ethylene-vinyl acetate copolymer component or mixture thereof comprisesd 10 ~ 95 percent of the first component ternary resin system and the weight ratio of acrylonitrile to styrene is 1~50/99~50;
   2. 90 ~ 10 percent by weight of a second component comprising a ternary resin of acrylonitrile, chlorinated polyethylene and styrene, wherein the weight ratio of acrylonitrile to styrene is 1~50/99~50, containing 10 ~ 95 percent by weight chlorinated polyethylene having a chlorination degreee of 25 ~ 45 percent by weight, the content of said chlorinated polyethylene component in the whole resin composition being 5 ~ 40 percent by weight and the total amount of said chlorinated polyethylene component and at least one of the members selected from the group consisting of the butadiene rubber component, the acrylic rubber component, the ethylene-propylene rubber component, and the ethylene-vinyl acetate copolymer component in said ternary resins (1) being not over 50 percent by weight of the resin composition; and 3. 2 ~ 15 PHR of antimony trioxide based on 100 parts by weight of the resin composition, wherein all or part of the acrylonitrile can be replaced by methyl methacrylate and all or part of the styrene can be replaced by α-methylstyrene.

2. The resin composition as claimed in claim 1 wherein said resin composition further contains 5 ~ 65 PHR of polyvinyl chloride as a secondary flame retardant.

3. The resin composition as claimed in claim 1 wherein said resin composition further contains 2 ~ 20 PHR of an organohalogen compound as a secondary flame retardant.

4. The resin composition as claimed in claim 1 wherein said resin composition further contains 2 ~ 20 PHR of a halogenated phosphate ester as a secondary flame retardant.

5. The resin composition as claimed in claim 1 wherein said resin composition has a combustion rate of less than 3 cm/min.

6. The resin composition as claimed in claim 1 wherein the first component ternary resin comprises a member selected from the group consisting of:
   a. a graft copolymer of acrylonitrile or styrene onto the member selected from the group consisting of the butadiene rubber component, acrylic rubber component, ethylene-propylene rubber component, ethylene-vinyl acetate copolymer and a mixture thereof;
   b. a copolymer:copolymer mixture of a graft copolymer as in (a) plus an acrylonitrile-styrene copolymer; and
   c. a rubbery component:copolymer mixture of the member selected from the group consisting of the butadiene rubber component, acrylic rubber component, ethylene-propylene rubber component, ethylene-vinyl acetate copolymer component and the mixture thereof with an acrylonitrile-styrene copolymer; wherein all or part of the acrylonitrile can be replaced by methyl methacrylate and all or part of the styrene can be replaced by α-methylstyrene.

7. The resin composition as claimed in claim 6 wherein the member selected from the group consisting of the acrylonitrile-styrene copolymer wherein all or part of the acrylonitrile can be replaced by methyl methacrylate and all or part of the styrene can be replaced by α-methylstyrene exhibits an [η] value in chloroform at 30°C of from about 0.5 to about 2.0.

8. The resin composition as claimed in claim 6 wherein the first component ternary resin system is a graft copolymer of the recited components onto the rubbery component wherein the ratio of acrylonitrile to styrene or α-methylstyrene is 1~50/99~50 by weight percent and the ratio of methyl methacrylate to styrene is 1~80/99~20 by weight percent, acrylonitrile/methyl methacrylate systems having a permissible maximum weight percent in the 50 ~ 80 weight percent range.

9. The resin composition as claimed in claim 7 wherein the the first component ternary resin system comprises a graft copolymer of the recited components blended with an acrylonitrile-styrene copolymer wherein the ratio of acrylonitrile to styrene or α-methylstyrene is 1~50/99~50 by weight percent and the ratio of methyl methacrylate to styrene is 1~80/99~20 by weight percent, acrylonitrile/methyl methacrylate systems having a permissible maximum weight percent in the 50 ~ 80 weight percent range.

10. The resin composition as claimed in claim 7 wherein the first component comprises a blend of at least one of the members selected from the group consisting of the butadiene rubber component, the acrylic rubber component, the ethylene-propylene rubber component and the ethylene-vinyl acetate copolymer component with an arcylonitrile-styrene copolymer, wherein the ratio of acrylonitrile to styrene or α-methylstyrene is 1~50/99~50 by weight percent and the ratio of methyl methacrylate to styrene is 1~80/99~20 by weight percent, acrylonitrile/methyl methacrylate systems having a permissible maximum weight percent in the 50 ~ 80 weight percent range.

11. The resin composition as claimed in claim 6 where the rubber component is at least in part the butadiene rubber component, which is polybutadiene having a Mooney viscosity $ML_{1+4}$ of about 30 to about 55 or a styrene-butadiene rubber comprising less than 85 weight percent styrene and having a Mooney viscosity of about 20 to about 165, and:
   for the graft copolymer (a) or the copolymer mixture (b),
   acrylonitrile and styrene are grafted onto said rubbery component, wherein all or part of the acrylonitrile can be replaced by methyl methacrylate and all or part of the styrene can be replaced by α-methylstyrene, and wherein the ratio of acrylonitrile to styrene or α-methylstyrene is 1–50/99–50 by weight percent and the ratio of methyl methacrylate to styrene is 1–80/99–20 by weight percent, acrylonitrile/methyl methacrylate systems having a permissible maximum weight percent in the 50 – 80 weight percent range;
   and for the copolymer: copolymer mixture (b) or the rubbery component: copolymer mixture (c) the graft copolymer is the same as above and the acrylonitrile-styrene copolymer and/or methyl methacrylate and/or α-methylstyrene substituted form thereof exhibits an [η] value in chloroform at 30°C of from about 0.5 to about 2.0.

12. The resin composition as claimed in claim 6 where the rubbery component is at least in part the acrylic rubber component, which has a nitrogen content of about 15 to about 60 weight percent and a Mooney viscosity $ML_1+_4$ of about 30 to about 130,
   and for the graft copolymer (a) or the copolymer mixture(b),
   acrylonitrile and styrene are grafted onto said rubbery component, wherein all or part of the acrylonitrile can be replaced by methyl methacrylate and all or part of the styrene can be replaced by α-methylstyrene, and wherein the ratio of acrylonitrile to styrene or α-methylstyrene is 1–50/99–50 by weight percent and the ratio of methyl methacrylate to styrene is 1–80/99–20 by weight percent, acrylonitrile/methyl methacrylate systems having aa permissible maximum weight percent in the 50–80 weight percent range;
   and for the copolymer: copolymer mixture (b) or the rubbery component: copolymer mixture (c) the graft copolymer is the same as above and the acrylonitrile-styrene copolymer and/or methyl methacrylate and/or α-methylstyrene substituted form thereof exhibits an [η] value in chloroform at 30° C of from about 0.5 to about 2.0.

13. The resin composition as claimed in claim 6 where the rubbery component is at least in part the ethylene-propylene rubber component, wherein the ethylene-propylene rubber has a density of from about 0.85 to about 0.87 and a Mooney viscosity $ML_{1+4}$ of from about 30 to about 120, and for the graft copolymer (a) or the copolymer mixture (b), acrylonitrile and styrene are grafted onto said rubbery component, wherein all or part of the arcylonitrile can be repplaced by methyl methacrylate and all or part of the styrene can be replaced by α-methylstyrene, and wherein the ratio of acrylonitrile to styrene or α-methylstyrene is 1–50/99–50 by weight percent and the ratio of methyl methacrylate to styrene is 1~80/00~20 by weight percent, acrylonitrile/methyl methacrylate systems having a permissible maximum weight percent in the 50 ~ 80 weight percent range;

and for the copolymer:copolymer mixture (b) or the rubbery component:copolymer mixture(c) the graft copolymer is the same as above and the acrylonitrile-styrene copolymer and/or methyl methacrylate and/or α-methylstyrene substituted form thereof exhibits an [η] value in chloroform at 30° C of from about 0.5 to about 2.0.

14. The resin composition as claimed in claim 13 wherein the ethylene-propylene rubber component is an ethylene-propylene copolymer or an ethylene-propylene-unconjugated diene terpolymer, the proportion of ethylene to propylene being from about 35 to about 85 weight percent ethylene and about 65 to about 15 weight percent propylene, and in the unconjugated diene containing terpolymer in an amount of on the order of 3 weight percent, based on ethylene plus propylene.

15. The resin composition as claimed in claim 6 where the rubbery component is at least in part the ethylene-vinyl acetate copolymer component, wherein the ethylene-vinyl acetate copolymer component has a molecular weight of from about 20,000 to about 200,000 and is 10 ~ 95 weight percent vinyl acetate, balance ethylene, and for the graft copolymer (a) or the copolymer mixture (b), acrylonitrile and styrene are grafted onto said rubbery component, wherein all or part of the acrylonitrile can be replaced by methyl methacrylate and all or part of the styrene can be replaced by α-methylstyrene, and wherein the ratio of acrylonitrile to styrene or α-methylstyrene is 1–50/99–50 by weight percent and the ratio of methyl methacrylate to styrene is 1–80/99–20 by weight percent, acrylonitrile/methyl methacrylate systems having a permissible maximum weight percent in the 50–80 weight percent range;

and for the copolymer: copolymer mixture (b) or the rubbery component: copolymer mixture (c) the graft copolymer is the same as above and the acrylonitrile-styrene copolymer and/or methyl methacrylate and/or α-methylstyrene substituted form thereof exhibits an [η] value in chloroform at 30° C of from about 0.5 to about 2.0.

16. The resin composition as claimed in claim 6 where the rubbery component is at least in part the acrylic rubbe component, wherein the ternary resin is a ternary resin of acrylonitrile, acrylic rubber and styrene, the acrylic rubber comprising a copolymer of an acrylic acid alkyl ester present in an amount of at least 65 weight percent of the copolymer, and for the graft copolymer (a) or the copolymer mixture (b), acrylonitrile and styrene are grafted onto said rubbery component, component, wherein all or part of the acrylonitrile can be replaced by methyl methacrylate and all or part of the styrene can be replaced by α-methylstyrene, and wherein the ratio of acrylonitrile to styrene or α-methylstyrene is 1~50/99~50 by weight percent and the ratio of methyl methacrylate to styrene is 1~80/99~20 by weight percent, acrylonitrile/methyl methacrylate systems having a permissible maximum weight percent in the 50 ~ 80 weight percent range;

and for the copolymer: copolymer mixture (b) or the rubbery component: copolymer mixture (c) the graft copolymer is the same as above and the acrylonitrile-styrene copolymer and/or methyl methacrylate and/or α-methylstyrene substituted form thereof exhibits an [η] value in chloroform at 30° C of from about 0.5 to about 2.0.

17. The resin composition as claimed in claim 16 wherein the acrylic acid alkyl ester is copolymerized with acrylonitrile or 2-chloroethyl vinyl ether.

18. The resin composition as claimed in claim 1 wherein the antimony trioxide comprises 3 ~ 8 PHR of the resin composition.

19. The resin composition as claimed in claim 1 wherein the antimony trioxide has an average particle size of from about 1 micron to about 4 microns.

* * * * *